United States Patent
Malewicz et al.

(10) Patent No.: US 11,608,927 B2
(45) Date of Patent: Mar. 21, 2023

(54) HYDRAULIC SNUBBER INSERT FOR GAS TURBINE ENGINE AND ASSOCIATED METHOD OF INSTALLATION

(71) Applicant: PRATT & WHITNEY CANADA CORP., Longueuil (CA)

(72) Inventors: Patryk Malewicz, Rzeszow (PL); Mateusz Sokolik, Przemyśl (PL)

(73) Assignee: PRATT & WHITNEY CANADA CORP, Longueuil (CA)

( * ) Notice: Subject to any disclaimer, the term of this patent is extended or adjusted under 35 U.S.C. 154(b) by 0 days.

(21) Appl. No.: 16/938,127

(22) Filed: Jul. 24, 2020

(65) Prior Publication Data

US 2022/0026006 A1 Jan. 27, 2022

(51) Int. Cl.
| | |
|---|---|
| F16L 55/027 | (2006.01) |
| F16L 55/04 | (2006.01) |
| F15D 1/02 | (2006.01) |
| F02C 7/22 | (2006.01) |
| F04B 11/00 | (2006.01) |

(52) U.S. Cl.
CPC ... F16L 55/02718 (2013.01); F16L 55/02736 (2013.01); F16L 55/04 (2013.01); *F02C 7/222* (2013.01); *F04B 11/0091* (2013.01); *F05D 2220/32* (2013.01); *F15D 1/025* (2013.01)

(58) Field of Classification Search
CPC ............ B01F 5/0619; B01F 2005/0627; B01F 2005/0637; F15D 1/025; F15D 1/0005; F16L 55/027; F16L 55/02709; F16L 55/02718; F16L 55/02736; F16L 55/02754; F16L 55/02772; F16L 55/0331; F16L 55/04; F16L 55/043; F22B 37/74

USPC ...................... 138/40, 42; 181/233, 264, 281
See application file for complete search history.

(56) References Cited

U.S. PATENT DOCUMENTS

| | | | | | |
|---|---|---|---|---|---|
| 1,094,667 | A | * | 4/1914 | Masten ...................... | F01N 1/12 165/182 |
| 1,377,970 | A | * | 5/1921 | Parent .................... | F16L 55/027 138/42 |
| 1,926,627 | A | * | 9/1933 | Michaels .................. | F02M 1/00 48/189.4 |
| 1,976,442 | A | * | 10/1934 | Finn ........................ | F16L 55/04 181/234 |
| 2,400,161 | A | * | 5/1946 | Mockridge ....... | F16L 55/02736 138/42 |
| 2,426,833 | A | * | 9/1947 | Lloyd ................... | B01F 5/0451 138/40 |

(Continued)

FOREIGN PATENT DOCUMENTS

| | | | | |
|---|---|---|---|---|
| DE | 19516358 C1 | * | 8/1996 | ......... F02M 37/0041 |
| EP | 3610145 | | 12/2021 | |

(Continued)

*Primary Examiner* — Robert K Arundale
*Assistant Examiner* — Richard K. Durden
(74) *Attorney, Agent, or Firm* — Norton Rose Fulbright Canada LLP (57) ABSTRACT

The hydraulic snubber insert can have an elongated stem and at least one segment extending transversally from the stem, each segment having a size and shape mating a cross-sectional size and shape of the liquid carrying line, and at least one aperture, the insert being configured for the at least one segment to be pushable snugly into the liquid carrying line and pullable out from the liquid carrying line via the stem.

15 Claims, 10 Drawing Sheets

(56) References Cited

U.S. PATENT DOCUMENTS

| | | | | |
|---|---|---|---|---|
| 2,553,141 | A * | 5/1951 | Maynard | F15D 1/0005 138/37 |
| 3,468,345 | A * | 9/1969 | Tam | F16L 55/027 138/42 |
| 3,508,629 | A * | 4/1970 | Haworth | F01D 25/18 184/6.4 |
| 4,050,479 | A | 9/1977 | Baumann | |
| 4,065,918 | A * | 1/1978 | Rifkin | B01D 53/86 60/299 |
| 4,090,559 | A * | 5/1978 | Megerlin | F28F 1/40 138/38 |
| 4,412,582 | A * | 11/1983 | Mecozzi | B01F 5/0606 165/159 |
| 4,420,016 | A * | 12/1983 | Nichols | F16L 3/003 138/103 |
| 4,473,043 | A * | 9/1984 | Furukawa | F01M 1/02 123/196 AB |
| 4,594,877 | A | 6/1986 | Kyker | |
| 4,920,746 | A * | 5/1990 | Gebelius | F01N 1/083 181/231 |
| 5,156,680 | A * | 10/1992 | Orzechowski | F16L 55/02736 118/313 |
| 6,520,767 | B1 * | 2/2003 | Ahern | F23K 5/12 431/4 |
| 6,655,207 | B1 | 12/2003 | Speldrich et al. | |
| 6,820,431 | B2 * | 11/2004 | McManus | F23M 20/00 431/44 |
| 6,848,477 | B2 * | 2/2005 | Treusch | F02M 37/0041 138/44 |
| 9,527,231 | B2 * | 12/2016 | Horst | B29C 45/14549 |
| 9,709,450 | B2 | 7/2017 | Kurtz et al. | |
| 9,982,601 | B2 * | 5/2018 | Heims | F01D 25/20 |
| 2005/0173119 | A1 | 8/2005 | Hay et al. | |
| 2009/0065295 | A1 | 3/2009 | Sherikar et al. | |
| 2011/0147322 | A1 * | 6/2011 | Payne | F16N 39/06 210/805 |
| 2012/0060619 | A1 | 3/2012 | Gardner et al. | |
| 2016/0177836 | A1 * | 6/2016 | Wickstrom | F02C 7/22 60/772 |
| 2016/0208974 | A1 * | 7/2016 | Suganuma | F23K 5/00 |
| 2016/0333736 | A1 * | 11/2016 | Parnin | F16C 35/067 |
| 2017/0159868 | A1 * | 6/2017 | Fisher | F16L 55/02718 |
| 2019/0162350 | A1 | 5/2019 | Samarasinghe et al. | |
| 2020/0040821 | A1 | 2/2020 | Yeager et al. | |
| 2020/0040889 | A1 | 2/2020 | Smith | |
| 2020/0158063 | A1 | 5/2020 | Elder | |
| 2020/0348200 | A1 | 11/2020 | DeRosa et al. | |
| 2021/0116272 | A1 | 4/2021 | Carpenter et al. | |

FOREIGN PATENT DOCUMENTS

| | | | |
|---|---|---|---|
| FR | 1454310 A * | 7/1966 | ........ F16L 55/02718 |
| FR | 1454310 | 9/1966 | |
| GB | 2066984 | 7/1981 | |
| WO | 2019202616 | 10/2019 | |

* cited by examiner

HYDRAULIC SNUBBER INSERT FOR GAS TURBINE ENGINE AND ASSOCIATED METHOD OF INSTALLATION

TECHNICAL FIELD

The application relates generally to gas turbine engines and, more particularly, to the hydraulic circuits thereof.

BACKGROUND OF THE ART

Hydraulic snubbers, also referred to as pressure snubbers, are devices which are used to attenuate sharp pressure transients in liquids upstream of sensitive equipment. Many potential sources of sharp pressure transients exist, the most common ones perhaps being the shutting and opening of valves and pressure ripples from pumps. Similarly, various types of equipment sensitive to pressure transients exist, the most common in gas turbine engine applications likely being pressure sensors. For example, a pressure sensor construction can include a load cell applied against a diaphragm which is configured to elastically deform within a given pressure range, and the diaphragm is typically designed in a manner to reach a suitable trade-off between sensitivity and the extent of the pressure range. If the pressure range is exceeded, the diaphragm can plastically deform, which destroys the sensor. Hydraulic snubbers in the form of accessory fittings can be positioned in the liquid solid line, between the potential pressure transient source and the sensitive equipment. They can be used to avoid the loss of function of the sensitive equipment or to provide accurate readings (such as in the case of Bourdon tube pressure gauges). Pressure snubbers are typically configured to attenuate sharp pressure fluctuations (transients), such as may occur over a relatively small duration and/or with high frequency (such as less than one second). Indeed, the pressure fluctuations which pressure sensors are designed to monitor in liquid carrying lines of gas turbine engines can be of significantly longer duration, such as more than one second, for instance.

While existing pressure snubbers were satisfactory to a certain degree, there remained room for improvement. For example, in the case of oil lines in gas turbine engines, the oil temperature can vary significantly depending on the engine's operating conditions throughout the operating envelope, and the oil viscosity varies significantly with temperature. This particular kind of scenario can make it difficult to achieve required sharp pressure transients attenuation while maintaining sufficient sensor response. Moreover, cost, durability, maintenance load and weight are other example factors which can be relevant in providing a pressure snubber suitable for a given application.

SUMMARY

In one aspect, there is provided a hydraulic snubber insert for a liquid carrying line of a gas turbine engine, the insert comprising an elongated stem and at least one segment extending transversally from the stem, each segment having a size and shape mating a cross-sectional size and shape of the liquid carrying line, and having at least one aperture, the insert being configured for the at least one segment to be pushable snugly inside and along the liquid carrying line and pullable out from the liquid carrying line via the stem.

In another aspect, there is provided a gas turbine engine comprising a liquid carrying line, a pressure transient source in fluid flow communication with the liquid carrying line, a sensor in fluid flow communication with the liquid carrying line, and a hydraulic snubber insert positioned in the liquid carrying line, between the pressure transient source and the sensor, the insert comprising an elongated stem and at least one segment extending transversally from the stem, each segment having a size and shape snugly mating a cross-sectional size and shape of the liquid carrying line, and having at least one aperture.

In a further aspect, there is provided a method of installing a hydraulic snubber insert into a liquid line of a gas turbine engine, the method comprising: introducing a first end of the insert into the liquid line, and pushing the insert into the liquid line, including pushing at least one segment in friction sliding engagement along an inner wall of the liquid line via a stem, the segment protruding transversally from the stem.

DESCRIPTION OF THE DRAWINGS

Reference is now made to the accompanying figures in which:

FIG. 2 is a longitudinal cross-sectional view of a liquid carrying line with a hydraulic snubber insert therein, with FIGS. 2A and 2B being cross-sectional views taken along corresponding lines of FIG. 2;

FIGS. 5A and 5B are graphs showing relationships between cut depth, orifice geometry, and cross sectiona area and Lohm rate, respectively, whereas

FIG. 6 is a longitudinal cross-sectional view of a liquid carrying line with an alternate embodiment of a hydraulic snubber insert therein, with FIG. 6A being a cross-sectional view taken along lines 6A-6A in FIG. 6.

DETAILED DESCRIPTION

Figure 1:
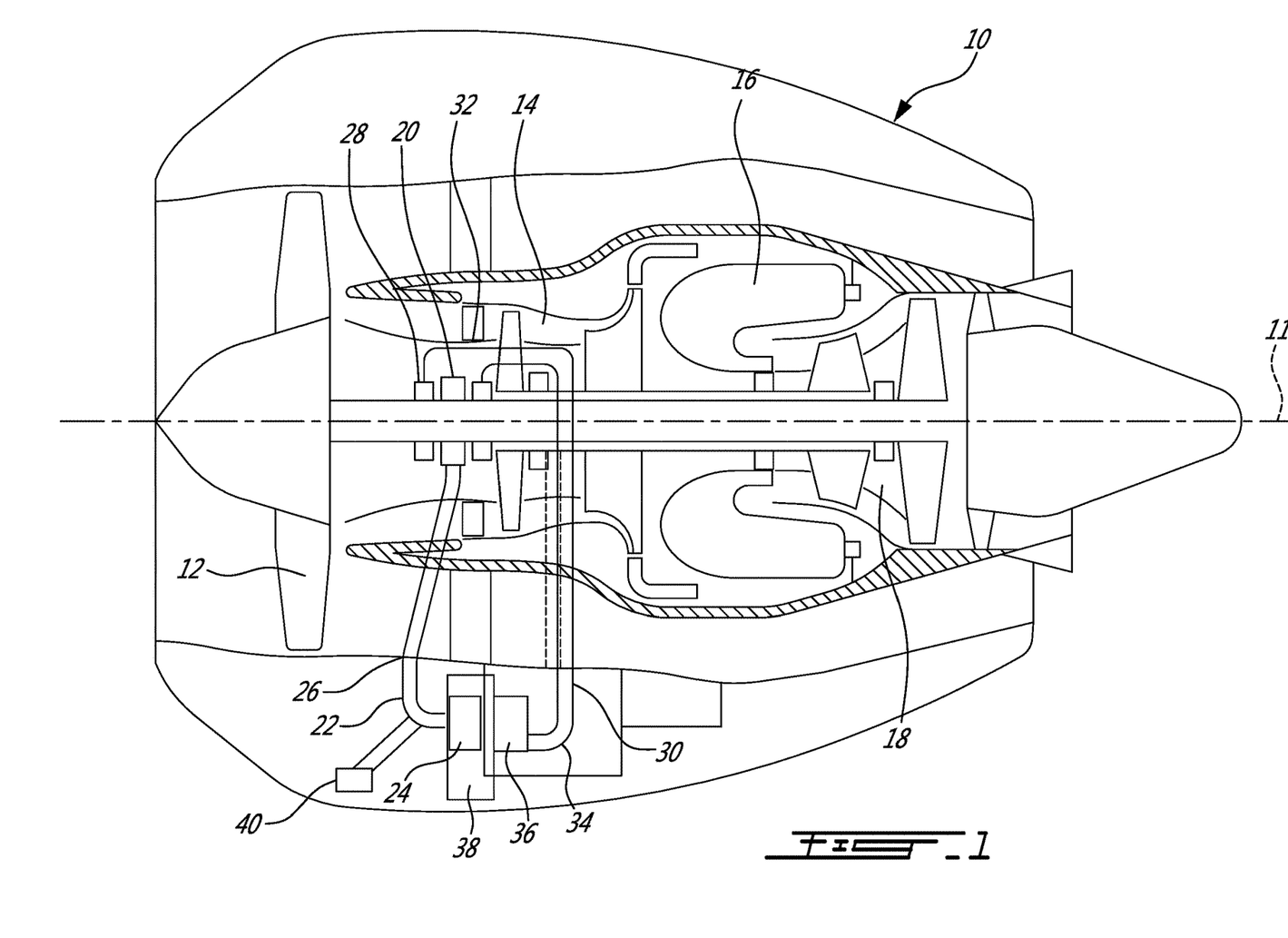
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20. The oil pump 24 typically draws the oil from an oil reservoir 38, and it is relatively common to use some form of air/oil separating device in the return line. A pressure sensor 40 can be used to monitor the oil supply operation, and can have a diaphragm exposed to the oil pressure in the oil supply line, for instance.

In one example, the pressure sensor 40 can form part of a low oil pressure (LOP) switch which, for instance, can be configured to shut down an auto-pilot system (APS) in the event where the pressure falls below a predetermined threshold. While during typical operation of the gas turbine engine, the average pressure in the oil line can vary slowly, typically not changing significantly within duration windows of more than one second, the instantaneous oil pressure can vary sharply due to the operation of the main pump. Indeed, in the case of a gear pump, for instance, the flowrate generated by the pump will not be constant, but rather minutely influenced due to the effect of individual ones of the gear teeth on the flow, producing relatively sharp, repetitive variations in pressure in duration windows of less than one second, and even in the $10^{th}$ of a second range. Depending on the operating conditions, such regular, sharp, decreases in pressure may be sufficient to toggle the low pressure switch, even though such high frequency pressure transients are not what the low pressure switch is configured to be responsive to.

One potential solution to this problem is to introduce a pressure snubber between the LOP switch and the pump 24. However, looking into this more closely, there may be several design requirements for such a solution to be viable, such as: a) achieving sufficiently high attenuation rate for the pressure transient; b) achieving sufficiently low fill-up time (e.g. a minimum pressure signal threshold build up below 10 seconds, preferably in the order of 1 second or even less); and c) providing a solution versatile enough to address a range of oil temperatures (e.g. from −40F to 270F), and the associated range of oil viscosity. There may also be a challenge in obtaining accurate pressure reading due to slowly released high pressure in transducer cavity or in restrictor.

Accordingly, one may consider using a pressure snubber coupling having a single orifice, but realize that if such a device was adjusted to provide sufficient attenuation for the application, it would then only be suitable for a range of oil temperatures smaller than the actual range of oil temperatures in the application. Alternately, if adjusting the orifice size for the achieving suitable fill-up time over the entire oil temperature range, one may not be able to achieve sufficient attenuation rate.

As will be explained below in further detail, it was found that such limitations could be addressed by using a composite pressure snubber formed of a plurality of orifices, such as, for instance, a sequence of segments each having one or more orifice. However, this leaves the issues of achieving satisfactory costs, convenience, and weight.

It was found that such latter considerations could satisfactorily be addressed, at least in some embodiments, by providing the pressure snubber in the form of an insert designed to be introduced within an existing liquid carrying line, as opposed to, say, a coupling configured to be assembled in line between the sensor outlet of the line and the sensor. The insert can have a plurality of segments mounted to a stem via which the segments can be pushed into or pulled out from the liquid carrying line, for instance, and even held longitudinally in place during operation such as by way of one form or another of a retainer which can be provided at a proximal end of the stem and secured into place during operation for instance. The stem can be flexible to make the hydraulic snubber insert adaptable to curvilinear liquid lines, or rigid. The stem can be made of a metal wire, and the segments can be secured to the stem, such as by being made of a polymer or other metal overmoulded onto the stem, for instance. Alternately, the insert can be designed in a manner to be a single moulded component, for instance. Using a stem which is flexible while having a certain amount of compressive strength, can allow to provide for the possibility of introducing the insert into a curvilinear conduit, for instance, allowing the insert to be usable in a manner somewhat akin to how a drain snake is used in unclogging curved drain pipes. Examples are presented below in association with a gas turbine engine context, but it will be understood that the proposed solution appears significantly original, and may benefit from use in contexts other than gas turbine engine contexts.

Figures 2, 2B:
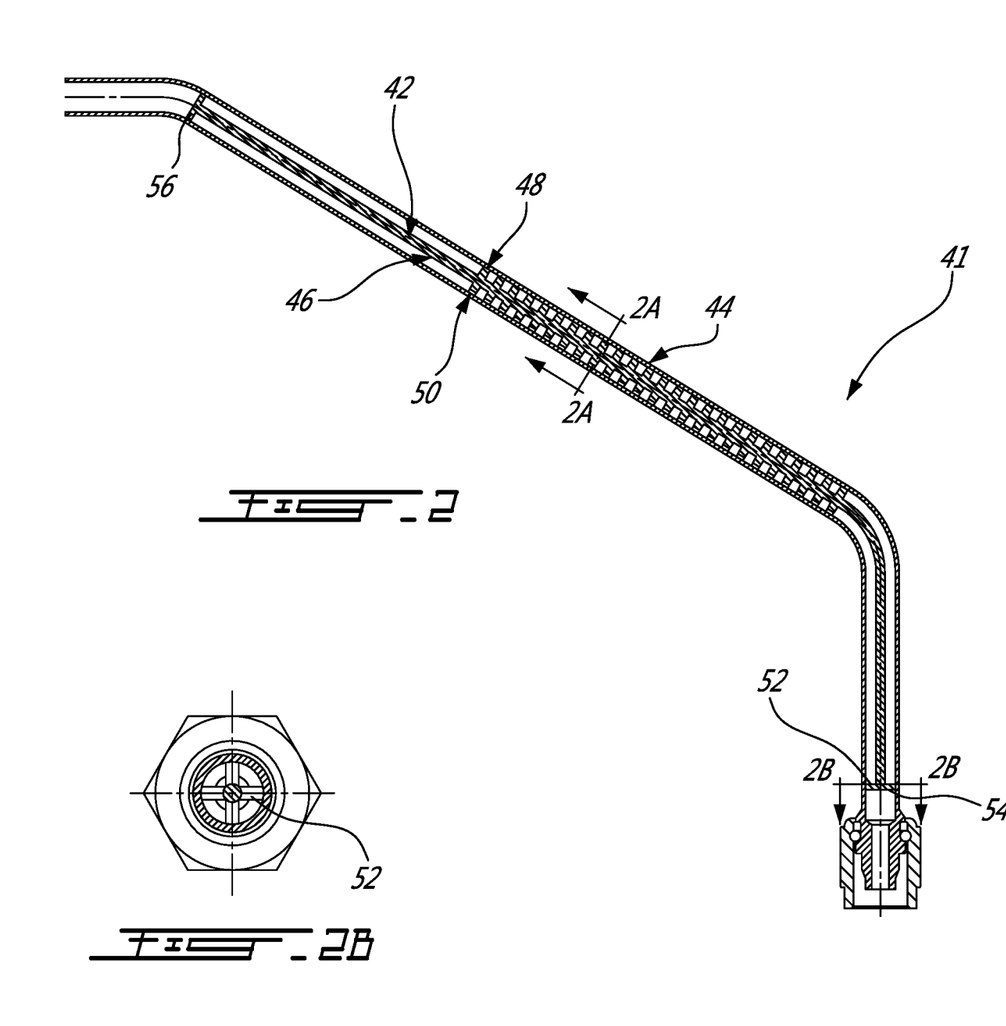

FIG. 2 shows an example embodiment of a pressure snubber 41 formed by a hydraulic snubber insert 42 introduced into an existing liquid carrying line 44, upstream of a sensitive equipment such as a pressure sensor 40. In this embodiment, the snubber insert 42 has an elongated stem 46 which is made of a sturdy, yet flexible material. The amount of required flexibility can depend on the minimum bend radius in the liquid carrying line 44, for instance, and for straight lines, one may prefer using a rigid material metal wire or braided line for the stem 46. The snubber insert 42 further has at least one segment 48, typically a plurality, which extend transversally from the stem 46. "Transversally", here, is used relative to refer to an orientation generally normal to the length of the stem 46. The segments 48 are interspaced from one another along the length of the stem 46 have a cross-sectional size and shape generally mating the cross-sectional size and shape of the liquid carrying line it is intended to fit.

Figure 2A:
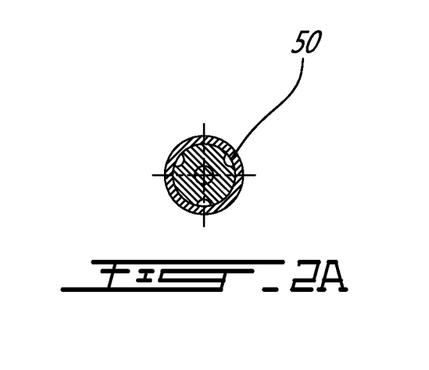

Each one of the segments 48 has at least one aperture 50, preferably more than one aperture 50, such as perhaps best seen in FIG. 2A. The apertures 50 can be provided in the form of open shapes such as "dents" formed along the periphery of the corresponding segment's outer edge, such as shown in FIG. 2A, and form a portion of the outer edge, but can alternately be closed shapes radially recessed from the outer edge. In this embodiment, each segment 48 has three equidistant semi-circular orifices along its outer edge such as shown in FIG. 2A. The insert 42 can be handled via the stem 46, and therefore, by pushing the stem 46, the segments which can snugly fit the liquid carrying conduit can be pushed while being frictionally engaged with the inner surface (wall) of the liquid carrying conduit 44. The segments 48 can also be pulled out from the conduit by pulling the stem 46, which can remain externally accessible even when the insert 42 has been pushed into the position of use, which can be referred to as the snubbing position. The amplitude of the pressure transient can drop by a given step across each segment, due to the decrease in cross-sectional area through the segment (or otherwise said, through the at least one aperture per segment). In an alternate embodiment, the insert can include a single segment instead of a plurality of segments, for instance.

The insert can also have a retainer 52, which would typically be positioned at an end 54 of the insert opposite the end 56 which is first introduced into the liquid carrying line through the sensor aperture. The retainer 52 can be configured to abut against a corresponding end of the liquid carrying line 44, and therefore prevent the insert from being pulled deeper into the liquid carrying line 44 during operation. The retainer 52 can be configured to become trapped into place when the sensor 40 or other sensitive equipment is secured at the end of the liquid carrying line 44. In this embodiment, the insert has two retainers 52, one at each end 54, 56, and the insert is symmetrical and can alternately be engaged into the conduit via either end 54, 56. In alternate embodiments, the insert 42 may have a single retainer, or be provided without a retainer. In this embodiment, the retainer 52 also extends transversally, is cruciform, having four arms, and the tips of the arms can engage an flat annular edge surrounding the conduit's bore, thereby preventing the insert from being pulled further into the conduit due to vibrations or the like, for instance. Another component, such as a pressure sensor, can be secured to the end of the conduit and trap the retainer between the component and the annular edge, for instance, also preventing the insert from exiting the conduit unless the component is removed.

Figure 3:
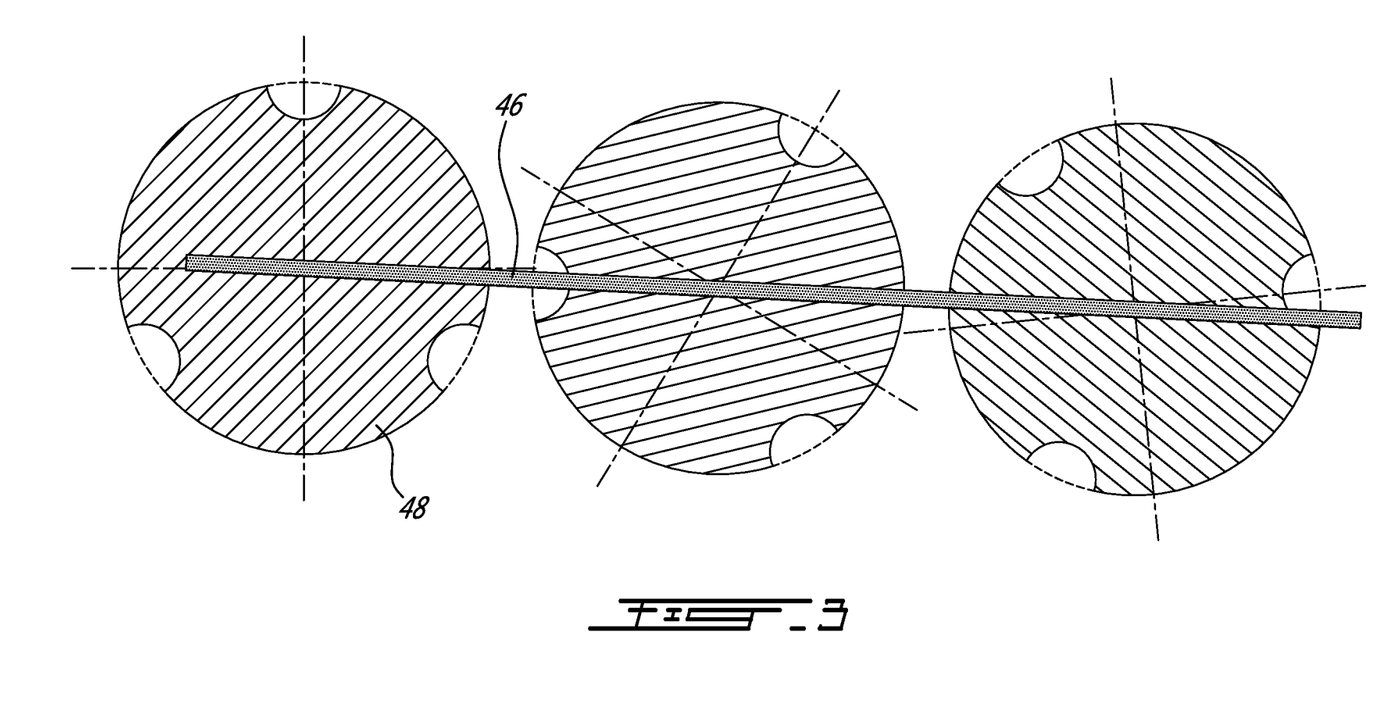
FIG. 3 is a schematic view showing the tangential off-setting of apertures in successive ones of the segments.

The exact configuration of the snubber insert 42 can vary depending on the embodiment. Indeed, many variables can be controlled in a manner to arrive to a suitable solution for the specific embodiment, such as the geometry of the apertures, the size of the apertures, the number of orifices per segment, the number of segments, the downstream volume (between the last segment and the sensitive equipment—it will be noted that to a certain extent, this volume can be controlled by the free length of stem extending between the end 54 of the insert 42 and the closest segment), and even the configuration of the apertures relative to one another, e.g. whether successive apertures are aligned with one another or clocked/rotated relative to one another—such as shown in FIG. 3 (alternately, the clocking can be by 180 degrees to produce a zig-zag pressure pattern), or whether the geometry is otherwise varied from one segment to another (e.g. progressively increasing or reducing the open surface area from one segment to another).

We will now illustrate one possible example of how a snubber insert 42 can be specifically adapted to a specific embodiment by variations in some of the afore-mentioned variables.

Indeed, the concept of Lohm rate can be used to select an appropriate attenuation rate for a given frequency of pressure ripple in pump applications.

One can reduce the Lohm rate (L) by increasing hole diameter (d) in accordance with the formula:

$$L=0.76/d^2 \quad (1)$$

with the diameter expressed in inches. In the case of parallel flows (i.e. multiple apertures per segment), the total Lohm rate $L_T$ for one segment can be expressed as $$1/L_T=1/L_1+1/L_2+1/L_N \quad (2)$$

where $L_1$, $L_2$, $L_N$ are the respective Lohm rates of apertures 1, 2 ... N. In the case of series flow, the total Lohm rate is $$L_T=\sqrt{(L_1^2+L_2^2+L_N^2)}. \quad (3)$$

Figure 4A:
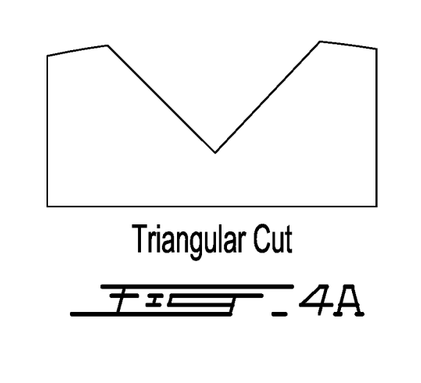
FIGS. 4A and 4B are enlarged views showing two potential aperture shapes, triangular and semi-circular, respectively.
Figure 4B:
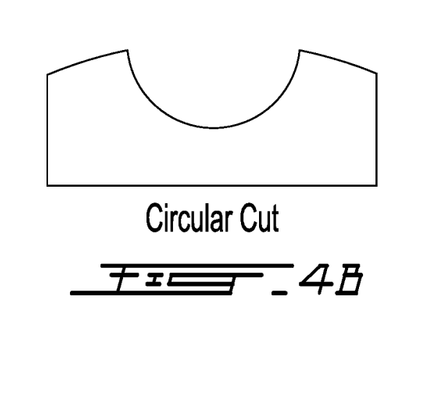
Figure 5A:
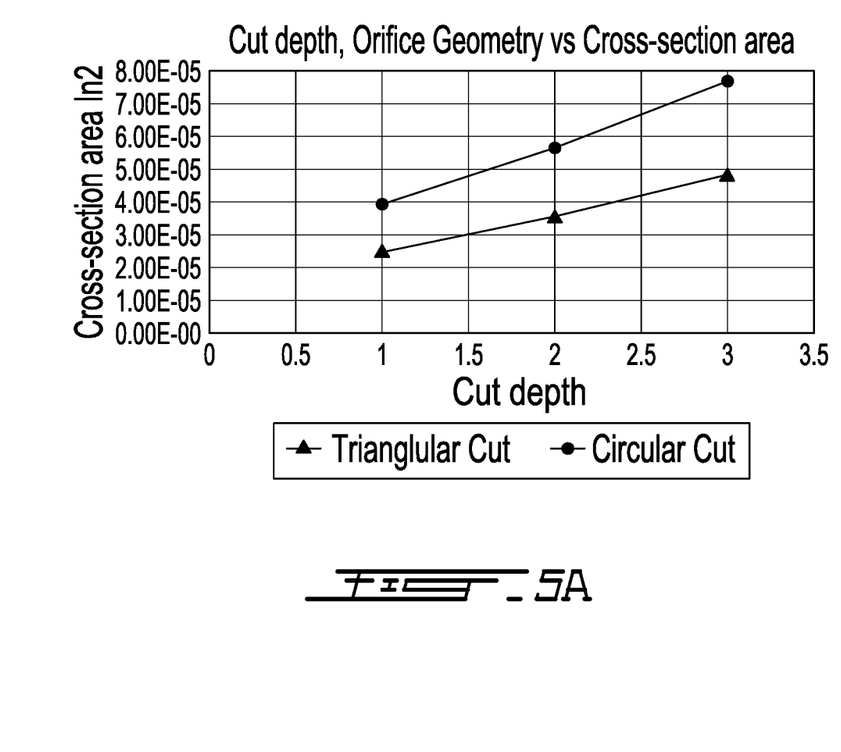
Figure 5B:
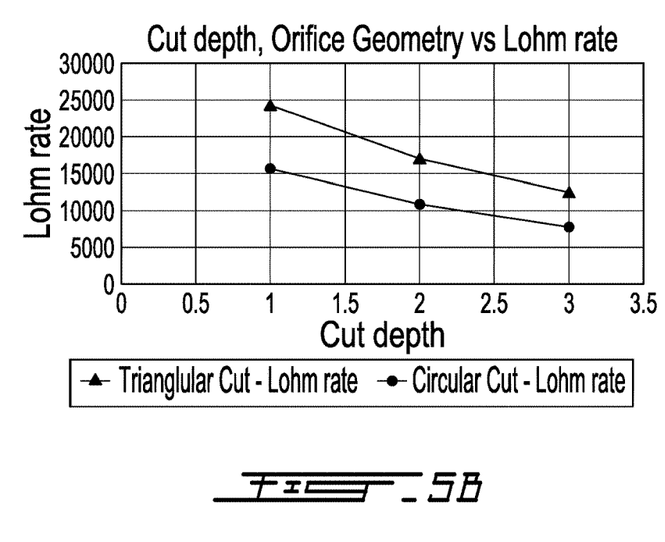
Figure 5C:
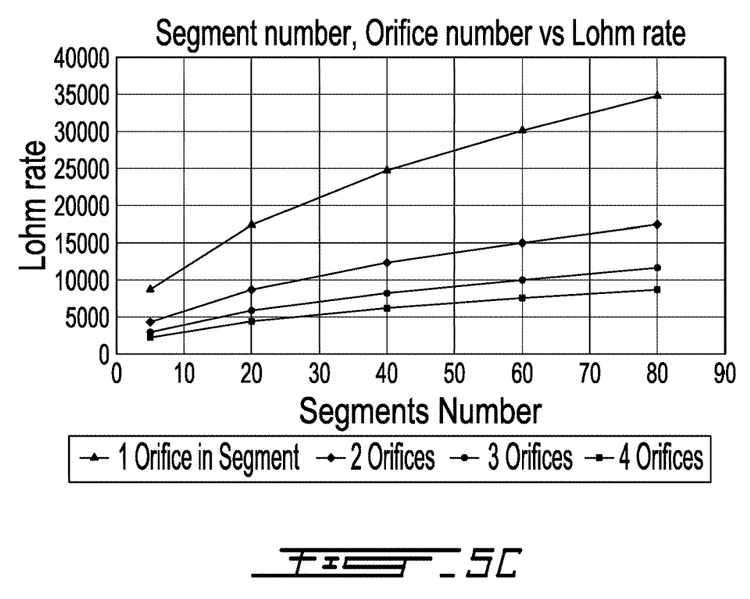
FIG. 5C is a graph showing relationships between number of segments, number of apertures per segment, and lohm rate.

Lohm rate can also change as a function of geometry. For instance, comparing triangular (90°) cut such as shown in FIG. 4A and semi-circular cuts such as shown in FIG. 4B, for different cut depths, one can produce the graph presented in FIG. 5A showing the resulting cross-sectional area of the aperture. Plotting for different cut depths and different orifice geometries leads to the resulting Lohm rates plotted in FIG. 5B. Similarly, the graph of FIG. 5C presents Lohm rate for varying number of segments, comparing cases of one aperture per segment (top) progressively to 4 orifices per segment (bottom).

Accordingly, one can achieve a desired Lohm rate in various ways, by tuning different variables, which can produce different effects on response time, allowing for versatility. Indeed, it has been observed that orifice geometry, for instance, can define cross-section area which directly translates to attenuation rate which single orifice can provide (Lohm rate). The geometry can have a significant impact on tolerance definition and overall feasibility of the solution. For instance, in the case of a semi-circular cut orifice with a radius of 0.005 and a tolerance of ±0.0005, the Lohm rate can change by roughly ±20% in the case of a single orifice. The orifice size can have a significant impact on cross-section area which can directly translate to attenuation rate which a single orifice can provide (Lohm rate). The number of orifices both in segment and in a row change the overall attenuation rate. In a single segment, more orifices in a segment decreases attenuation rate for a segment, whereas in a row, more orifices in a row increases the attenuation rate for the entire wire. Increasing downstream volume can also decrease required attenuation rate. In the case of segments having open-shaped apertures formed in the outer edge, the unapertured portions of the segments can seal the flow by applying pressure on the inner surface of the conduit.

Figures 6, 6A:
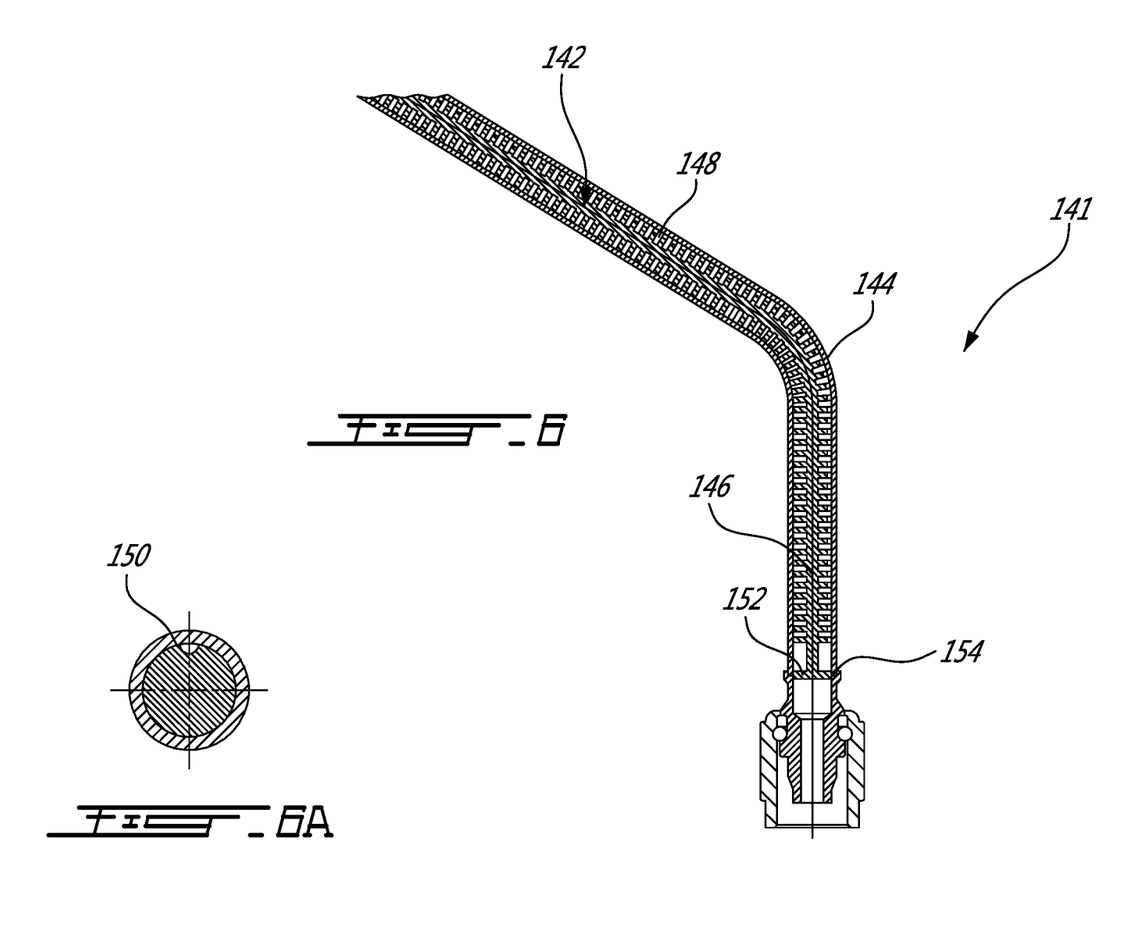

Indeed, FIG. 6 shows one such alternate embodiment of a pressure snubber 141 formed by a hydraulic snubber insert 142 introduced into an existing liquid carrying line 144. In this embodiment, the snubber insert 142 has an elongated stem 146 which is made of a sturdy, yet flexible material. The snubber insert 42 further has a plurality of segments which extend transversally from the stem 146. "Transversally", here, is used relative to refer to an orientation generally normal to the length of the stem 146. The segments 148 are interspaced from one another along the length of the stem 146 have a cross-sectional size and shape generally mating the cross-sectional size and shape of the liquid carrying line it is intended to fit.

Each one of the segments 148 has a single aperture 150 such as seen in FIG. 6A. The apertures 50 can be provided in the form of open shapes such as "dents" formed along the periphery of the corresponding segment's outer edge, such as shown in FIG. 2A, and form a portion of the outer edge. The insert 142 can be handled via the stem 146, and therefore, by pushing the stem 146 (which can be handled directly or via other segments or a retainer), the segments 148 which snugly fit the liquid carrying conduit can be pushed while being frictionally engaged with the inner surface (wall) of the liquid carrying conduit 144. The segments 148 can also be pulled out from the conduit by pulling the stem 146, which can remain externally accessible even when the insert 142 has been pushed into the snubbing position. The amplitude of the pressure transient can drop by a given step across each segment 148, due to the decrease in cross-sectional area through the segment 148 (or otherwise said, through the at least one aperture 150 per segment 150).

The insert 142 can also have a retainer 152 positioned at an end 154 of the insert. The retainer 152 can be configured to abut against a corresponding end of the liquid carrying line 144, and therefore prevent the insert from being pulled deeper into the liquid carrying line 144 during operation. The retainer 152 can be configured to become trapped into place when the sensor 40 or other sensitive equipment is secured at the end of the liquid carrying line 144. Another component, such as a pressure sensor 40, can be secured to the end of the conduit and trap the retainer 152 between the component and the annular edge, for instance, also preventing the insert 142 from exiting the conduit unless the component is removed.

Figure 7:
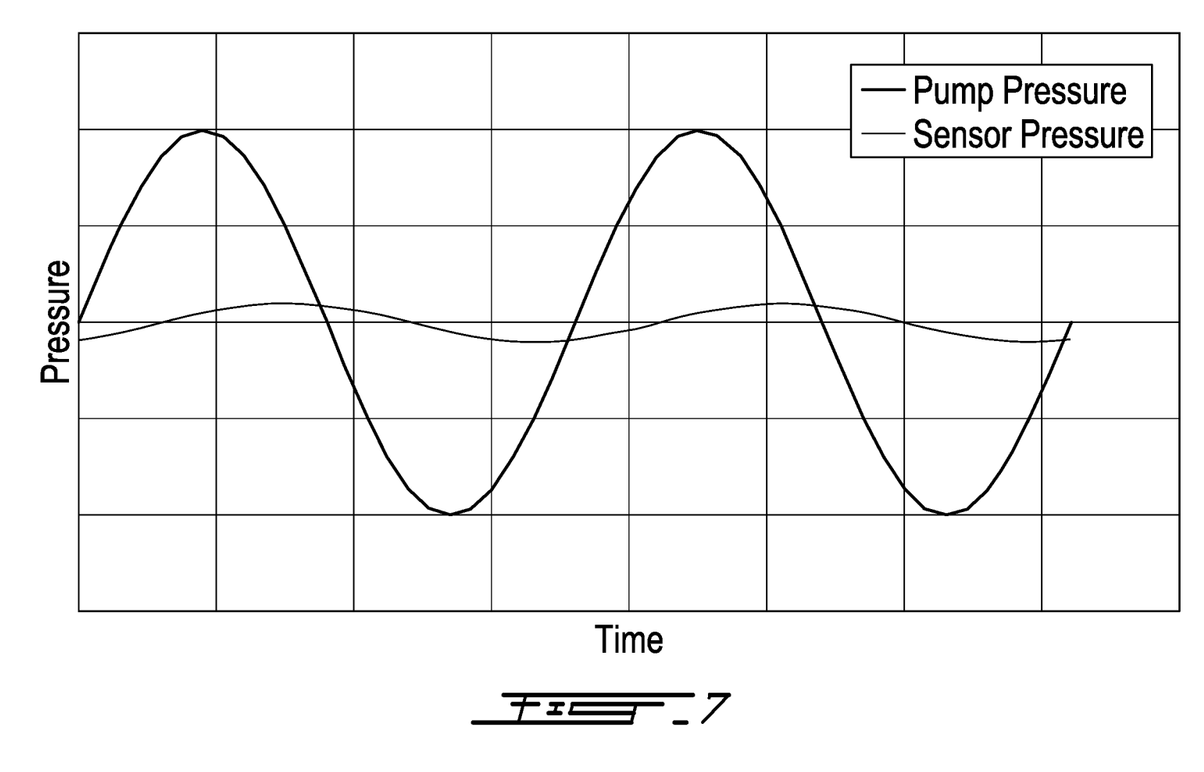
FIG. 7 is a graph showing pressure fluctuations at different points in a liquid line of a gas turbine engine.

Depending on the embodiment, the insert can have a phase offsetting effect in addition to an attenuation effect. This is illustrated in FIG. 7 which shows two superposed pressure graphs, one at the outlet of a pump exhibiting significant pump ripple (upstream of the insert), and the second one immediately upstream of the sensor. As seen, the insert, in this embodiment, has the effect of significantly attenuating the pressure ripple from the pump, and also slightly offsets the phase of the pressure ripple.

The insert 42, 142 can be inserted directly into the liquid carrying line at the time of manufacturing the gas turbine engine. Alternately, the inserted can be retrofitted to an existing gas turbine engine, several months or years after manufacturing the gas turbine engine.

Figure 8:
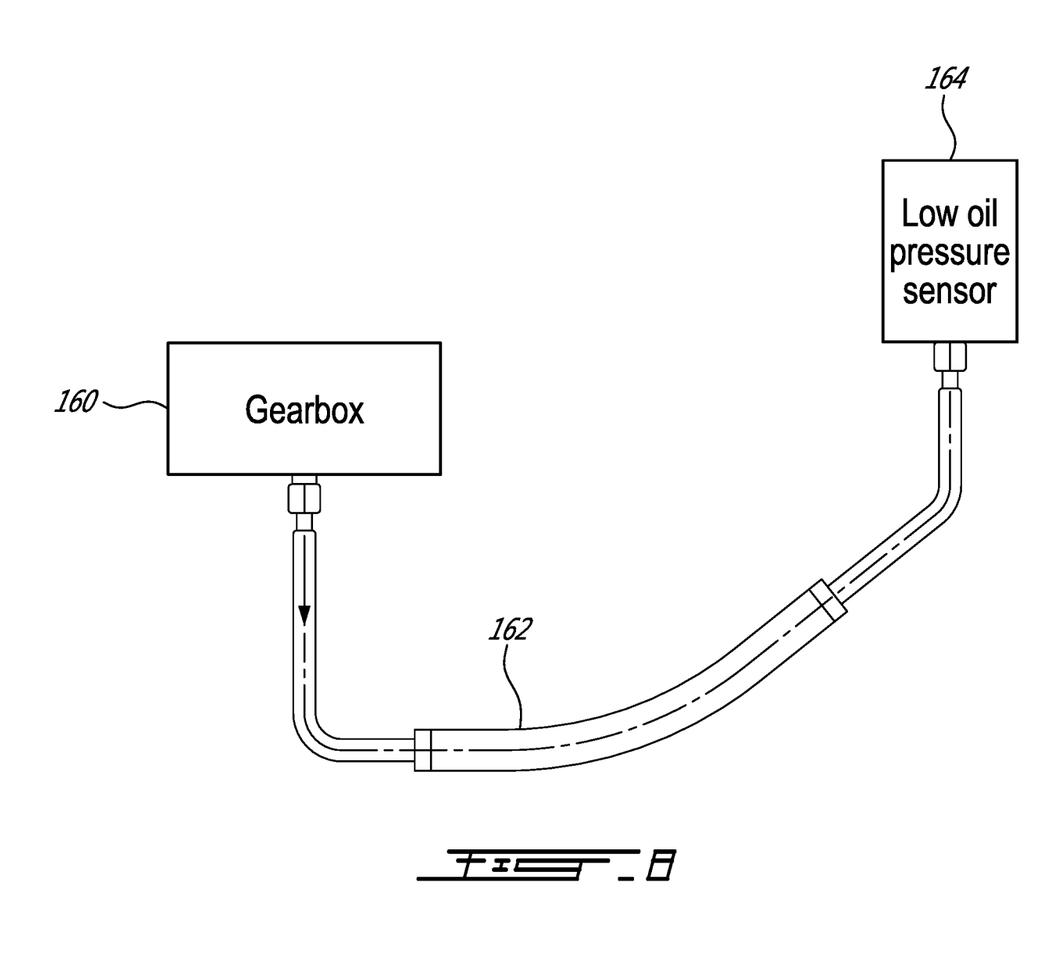
FIG. 8 is a schematic view of an example sensing apparatus of a gas turbine engine.
Figure 9:
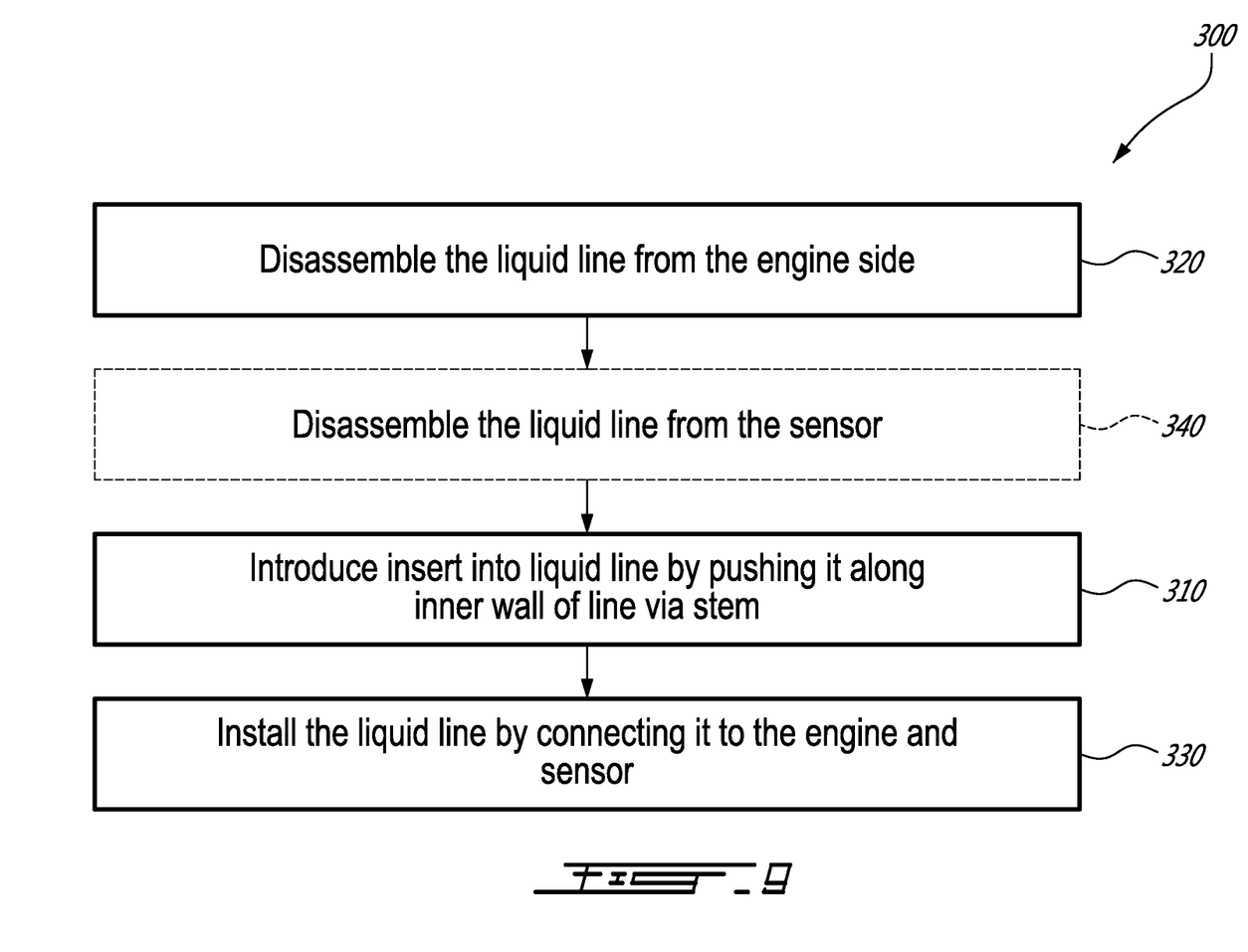
FIG. 9 is a flow chart illustrating an example method of installing a hydraulic snubber insert.

For instance, FIG. 8 shows an example of a solid tube or flexible sensing line referred to herein as a liquid carrying line 162 used between a gearbox 160 and a low oil pressure sensor 164 in a gas turbine engine. The liquid carrying line 162 can be a liquid carrying line 162 about to be installed in a new gas turbine engine, in which case the insert can be introduced 310 into the liquid line by pushing it along an inner wall of the line via the stem. Its end can be initially introduced via either end of the liquid line. As shown in FIG. 9, the liquid line can then be installed 330 by connecting it to the engine at one end, and to the sensor at the other end. Alternately, the liquid carrying line 162 can be an existing liquid carrying line 162 of a gas turbine engine having several years of service for instance, in which case the liquid carrying line 162 will first be disassembled 320, 340, from either the engine side, the sensor side, or both the engine side and the sensor side. If disassembled from the engine side, the liquid carrying line 162 can be disassembled from the gearbox 160 for instance. If disassembled from the sensor side, the liquid carrying line 162 can be disassembled from the low oil pressure sensor, for instance. Accordingly, the aperture of the liquid carrying line through which the insert is introduced can be a few parts of a sensing apparatus, such as fluid carrying line, ferrule, fitting, sensor passage leading to pressure chamber with diaphragm, to name a few examples.

Figure 10:
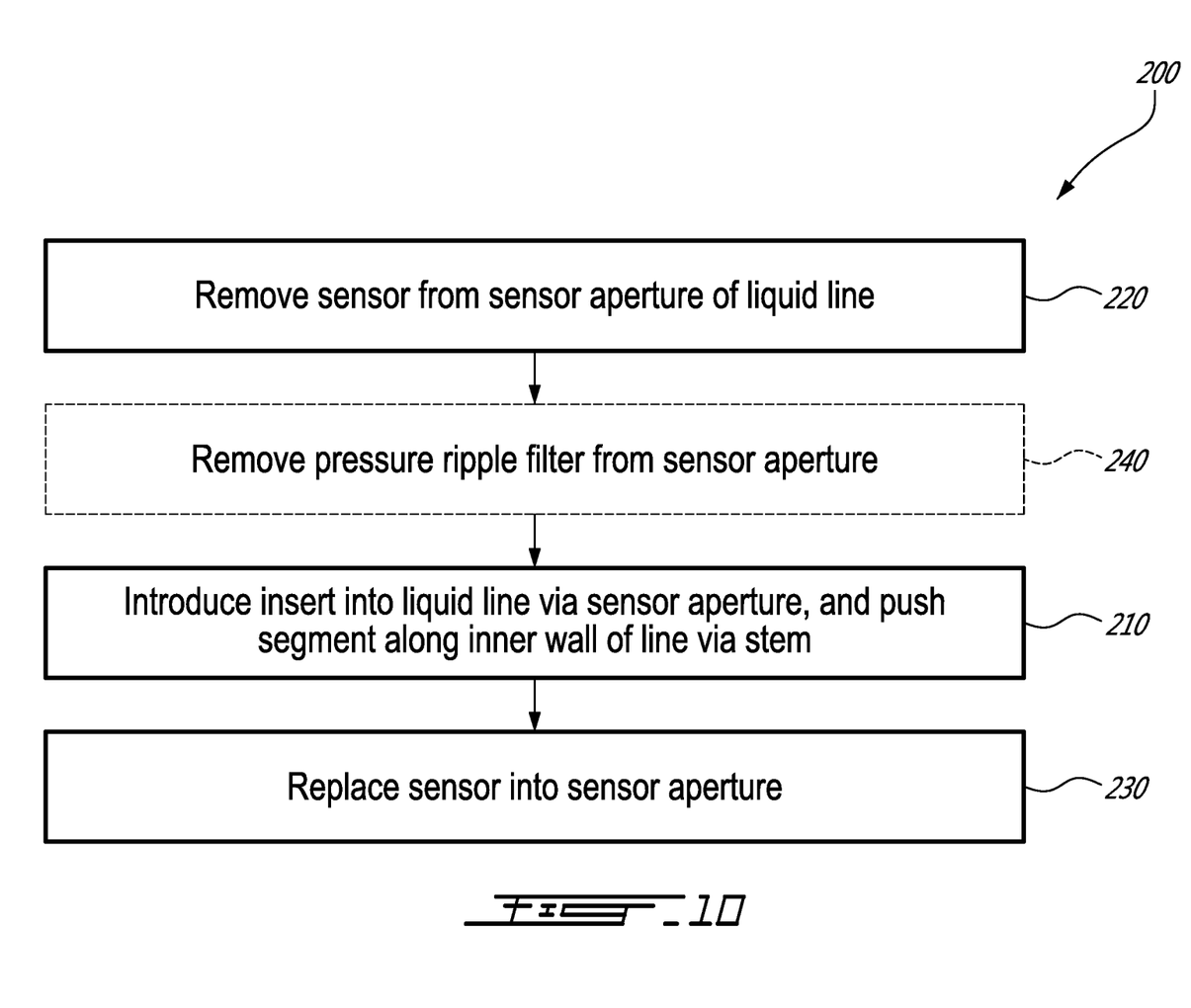
FIG. 10 is flow chart illustrating an other example method of installing a hydraulic snubber insert.

FIG. 10 shows another example method of installing the insert 200, which includes introducing 210 a first end of the insert into the liquid line via the sensor end, and therefore through the aperture onto which the sensor is installed (referred to as the sensor aperture hereinafter), and pushing the insert into the liquid line. This can include pushing at least one segment in friction sliding engagement along an inner wall of the liquid line via a stem (directly or indirectly), the segment protruding transversally from the stem. In the case of a retrofit application, reaching this step 210 can require removing a sensor 220 (either in good condition or damaged) from the sensor aperture, and the step 210 will likely be followed by replacing 230 a sensor (the same one or a new one in the case of a damaged sensor). If the insert has a retainer, the sensor can trap the retainer into place, preventing the snubber insert from moving thereafter via the stem. A retrofit application can also involve an optional step of removing 240 an existing hydraulic snubber device and replacing it with the hydraulic snubber insert. The existing hydraulic snubber device can be a pressure ripple snubber fitting secured between the sensor and the line, for instance.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, depending on the application, the line in which the snubber insert is inserted can be an external line, or an integrated passage such as an integrated passage present in a gearbox housing for instance. The line can be an oil line, or can be a line adapted to carry another liquid than oil, such as fuel for instance. If used, the retainer can take various forms and have various shapes, having the function of securing the stem in relation with the line. The connection between the segments and the stem can be rigid, or somewhat flexible. The stem can extend centrally relative to the segments or be offset from the center of the segments. Yet further modifications could be implemented by a person of ordinary skill in the art in view of the present disclosure, which modifications would be within the scope of the present technology.

The invention claimed is:

1. A hydraulic snubber insert for a liquid carrying line of a gas turbine engine, the insert comprising an elongated stem and a plurality of segments extending transversally from the stem, each segment having a size and shape matching a cross-sectional size and shape of the liquid carrying line, and having at least one aperture, the insert being configured for the plurality of segments to be pushable inside and along the liquid carrying line while being frictionally engaged with the liquid carrying line, and pullable out from the liquid carrying line via the stem, the elongated stem being flexible to follow a curvature defined by the liquid carrying line, the plurality of segments spaced from one another along a length of the stem, and one or more of:
   a number of the plurality of segments,
   a number of said at least one aperture per segment,
   a configuration of said at least one aperture per segment,
   a shape of the apertures, and
   a configuration of the at least one aperture in each segment relative to the at least one aperture of the other segments
are configured to provide an attenuation of pressure ripples by at least 50% while providing a response time of pressure variations across the hydraulic snubber insert via the apertures below 10 seconds.

2. The hydraulic snubber insert of claim 1 wherein the at least one aperture of adjacent segments are tangentially offset from one another.

3. The hydraulic snubber insert of claim 1 wherein the total open cross-sectional area of the at least one aperture increases from one segment to another along the length of the stem.

4. The hydraulic snubber insert of claim 1 wherein the at least one aperture includes a plurality of apertures tangentially spaced apart from one another around the stem.

5. The hydraulic snubber insert of claim 1 wherein each segment is flat and planar.

6. The hydraulic snubber insert of claim 1 wherein the stem extends across a center of each segment.

7. The hydraulic snubber insert of claim 1 wherein each segment has a circular cross-sectional shape.

8. The hydraulic snubber insert of claim 1 wherein the at least one aperture is an open shape defined along a radially outer periphery of each segment.

9. The hydraulic snubber insert of claim 8 wherein the at least one aperture is semi-circular in shape.

10. The hydraulic snubber insert of claim 8 wherein the at least one aperture is a V-shaped notch defined into the radially outer periphery.

11. The hydraulic snubber insert of claim 1 wherein each segment is made of a polymer overmoulded onto the stem.

12. The hydraulic snubber insert of claim 11 wherein the stem is a metal wire.

13. A gas turbine engine comprising a liquid carrying line, a pressure transient source in fluid flow communication with the liquid carrying line, a sensor in fluid flow communication with the liquid carrying line, and a hydraulic snubber insert positioned in the liquid carrying line, between the pressure transient source and the sensor, the insert comprising an elongated stem and a plurality of segments extending transversally from the stem, each segment having a size and shape matching a cross-sectional size and shape of the liquid carrying line and frictionally engageable with the liquid carrying line, and each segment having at least one aperture, the elongated stem being flexible and following a curvature defined by the liquid carrying line, the plurality of segments spaced from one another along a length of the stem, and one or more of:
- a number of the plurality of segments,
- a number of said at least one aperture per segment,
- a configuration of said at least one aperture per segment,
- a shape of the apertures, and
- a configuration of the at least one aperture in each segment relative to the at least one aperture of the other segments are configured to provide an attenuation of pressure ripples by at least 50% while providing a response time of pressure variations across the hydraulic snubber insert via the apertures below 10 seconds.

14. The gas turbine engine of claim 13 wherein the liquid carrying line is an oil line.

15. The gas turbine engine of claim 13 wherein the pressure transient source is a pump, wherein the pressure ripples are repetitive pressure transients generated by the pump during operation of the gas turbine engine.

* * * * *